United States Patent
Murphy et al.

(10) Patent No.: US 9,841,042 B2
(45) Date of Patent: Dec. 12, 2017

(54) CLAMP FOR INTERNALLY COUPLING AND DECOUPLING TWO COMPONENTS

(71) Applicant: Raytheon Company, Waltham, MA (US)

(72) Inventors: Matthew Glenn Murphy, Waltham, MA (US); Scott D. Thomas, Waltham, MA (US); Erick W. Elkins, Waltham, MA (US)

(73) Assignee: Raytheon Company, Waltham, MA (US)

( * ) Notice: Subject to any disclaimer, the term of this patent is extended or adjusted under 35 U.S.C. 154(b) by 140 days.

(21) Appl. No.: 14/210,184

(22) Filed: Mar. 13, 2014

(65) Prior Publication Data

US 2015/0260210 A1   Sep. 17, 2015

(51) Int. Cl.
*F16B 7/00* (2006.01)
*F16B 7/02* (2006.01)
*F16B 2/14* (2006.01)

(52) U.S. Cl.
CPC ............... *F16B 7/025* (2013.01); *F16B 2/14* (2013.01); *Y10T 403/557* (2015.01)

(58) Field of Classification Search
CPC .... Y10T 403/557; F16B 7/025; F16B 7/0413; F16B 7/042; F16B 7/1463; F16B 2/14; F42B 15/005; F42B 19/005; F42B 15/36; F16L 37/123; F16L 37/1235; B23K 37/0531; F16F 1/3732; F16F 9/58; F16F 9/585
USPC ...................................................... 411/371.1
See application file for complete search history.

(56) References Cited

U.S. PATENT DOCUMENTS

| | | | | |
|---|---|---|---|---|
| 2,508,039 A | * | 5/1950 | Neuwirth | F16B 7/1463 248/188.5 |
| 2,739,559 A | * | 3/1956 | Presse | B23K 37/0531 228/44.5 |
| 2,821,946 A | * | 2/1958 | Goekler | B23K 37/0531 228/44.5 |
| 3,115,859 A | * | 12/1963 | Haussler | B23K 37/0531 228/44.5 |

(Continued)

FOREIGN PATENT DOCUMENTS

| | | | | |
|---|---|---|---|---|
| DE | 19601273 A1 | * | 7/1997 | .......... E04F 11/1817 |
| DE | 10358766 A1 | * | 7/2005 | .......... E04F 11/1812 |

*Primary Examiner* — Josh Skroupa
*Assistant Examiner* — Matthew R McMahon (57) ABSTRACT

A clamp for internally coupling and decoupling two components can include a base fittable within an interior of at least one of two components to be coupled together. The clamp can also include an engagement member movably supported about the base. The engagement member can interface with and engage interior portions of the two components when in a coupled position separated from the interior portions of the two components when in a decoupled position. The clamp can further include a wedge movably supported about the base to facilitate movement of the engagement member between the coupled and the decoupled positions. In addition, the clamp can include a secure and release mechanism operable with the base and the wedge to alternately secure the wedge to maintain the engagement member in the coupled position and release the wedge to facilitate movement of the engagement member to the decoupled position.

20 Claims, 6 Drawing Sheets

(56) References Cited

U.S. PATENT DOCUMENTS

| | | | | |
|---|---|---|---|---|
| 3,122,383 | A * | 2/1964 | Hirsch | F16L 37/1235 285/397 |
| 3,369,725 | A * | 2/1968 | Thomas | B23K 37/0531 228/49.3 |
| 3,633,813 | A * | 1/1972 | Looney | B23K 37/0531 219/60 A |
| 3,742,186 | A * | 6/1973 | Finkel | B23K 37/0531 219/160 |
| 4,013,373 | A * | 3/1977 | Lamprecht | F16C 33/60 220/320 |
| 4,146,261 | A * | 3/1979 | Edmaier | F01D 25/243 285/364 |
| 4,187,759 | A * | 2/1980 | Toy | F42B 15/36 89/1.14 |
| 4,483,477 | A * | 11/1984 | Eckold | B23K 37/0531 228/42 |
| 4,648,736 | A * | 3/1987 | Harsch | B21D 43/057 269/43 |
| 4,657,361 | A * | 4/1987 | Eitel | G02B 7/182 248/467 |
| 4,767,276 | A * | 8/1988 | Barnes | F01D 5/3015 416/220 R |
| 4,776,507 | A * | 10/1988 | Hoffmann | B23K 37/0531 228/42 |
| 5,150,995 | A * | 9/1992 | Reinauer | B23B 31/02 403/297 |
| 5,288,005 | A * | 2/1994 | Beakley | B23K 37/0531 228/49.3 |
| 5,398,862 | A * | 3/1995 | Aleman | B23K 37/0531 219/74 |
| 5,535,938 | A * | 7/1996 | Leduc | B23K 37/0531 228/212 |
| 5,826,847 | A * | 10/1998 | Warner | F16B 37/0821 248/200.1 |
| 5,921,359 | A * | 7/1999 | Holle | A47C 3/28 188/271 |
| 6,050,531 | A * | 4/2000 | Wilcox | A47B 19/002 248/188.5 |
| 6,779,944 | B2 * | 8/2004 | Schnorrer | B23K 37/0531 285/420 |
| 7,004,669 | B1 | 2/2006 | Vaughn et al. | |
| 7,229,230 | B2 * | 6/2007 | Choy | F16B 7/025 403/297 |
| 8,408,836 | B2 * | 4/2013 | Mackie | B63B 3/08 403/338 |
| 8,794,584 | B2 * | 8/2014 | Shimada | F16M 13/02 248/615 |
| 9,151,352 | B2 * | 10/2015 | Mayr | F16F 1/3732 |
| 2010/0310696 | A1 * | 12/2010 | Schlepp | B29C 51/22 425/161 |

* cited by examiner

FIG. 4B

US 9,841,042 B2

CLAMP FOR INTERNALLY COUPLING AND DECOUPLING TWO COMPONENTS

BACKGROUND

Many devices exist that can join two parts or components in a "butt-type" joint. For example, external V-band clamps can be configured to contract about exterior ends of two components to be joined. On the other hand, internal V-band clamps can be configured to expand to secure interior ends of two components to be joined. One example application that utilizes butt-type joints is a sabot that carries a payload, such as an unmanned aerial vehicle (UAV), to be deployed.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Although external and internal V-band clamps have many uses, these clamps can have limitations for some applications. For example, some applications, such as a sabot launched from a launch tube, cannot tolerate external features that would interfere with launch of the sabot from the launch tube, which can preclude using an external V-band clamp to removably couple two components of the sabot. Furthermore, for a sabot designed to deploy a payload, interior features for coupling two sabot components cannot interfere with payload deployment. Additionally, the diameter of a sabot may be small enough that stresses in a V-band clamp resulting from the expansion/contraction needed to effectively couple/decouple the two components is beyond practical limits, which can result in yielding or failure of the V-band clamp. For example, internal V-band clamps are under compression stress and therefore must have sufficient thickness to prevent buckling. As a single piece internal V-band clamp reduces in overall nominal diameter, the percentage of overall diameter that the clamp must flex to engage or disengage as related to the overall nominal diameter increases. V-band clamp internal stress increases as the percent flex of nominal diameter increases, which can yield the clamp. Thus, some applications can benefit from a clamp that does not utilize exterior surfaces and that can utilize interior surfaces without interfering with interior space. In addition, some applications can also benefit from a clamp that can effectively couple two components having small diameters without compromising the structural integrity of the clamp.

Accordingly, a clamp for internally coupling and decoupling two components is disclosed that does not utilize exterior surfaces and utilizes interior surfaces without interfering with useful interior space, such as that for deploying a payload from one of the components. In one aspect, the clamp can accommodate small diameters without compromising the structural integrity of the clamp. The clamp can include a base configured to fit within an interior of at least one of two components to be coupled to one another. The clamp can also include an engagement member movably supported about the base, and configured to interface with and engage interior portions of the two components when in a coupled position and to be separated from the interior portions of the two components when in a decoupled position. The clamp can further include a wedge movably supported about the base and operable to facilitate movement of the engagement member between the coupled and the decoupled positions. In addition, the clamp can include a secure and release mechanism operable with the base and the wedge to alternately secure the wedge to maintain the engagement member in the coupled position and release the wedge to facilitate movement of the engagement member to the decoupled position.

In one aspect, an internal clamp system is disclosed. The system can include two components to be coupled to one another and an internal clamp to couple and decouple the two components. The clamp can have a base configured to fit within an interior of at least one of the two components. The clamp can also have an engagement member movably supported about the base, and configured to interface with and engage interior portions of the two components when in a coupled position and to be separated from the interior portions of the two components when in a decoupled position. The clamp can further have a wedge movably supported about the base and operable to facilitate movement of the engagement member between the coupled and the decoupled positions. Additionally, the clamp can have a secure and release mechanism operable with the base and the wedge to alternately secure the wedge to maintain the engagement member in the coupled position and release the wedge to facilitate movement of the engagement member to the decoupled position.

Figure 1A:
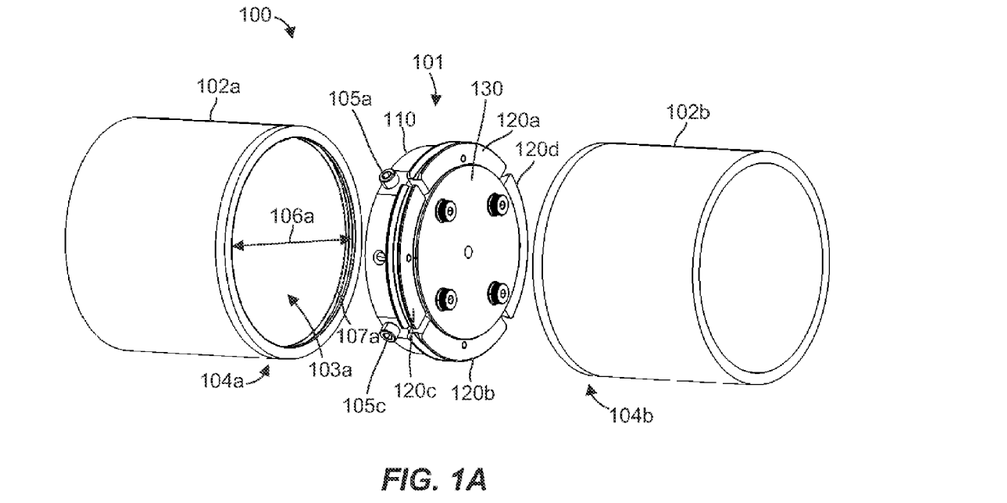
FIGS. 1A and 1B are exploded views of an internal clamp system in accordance with an embodiment of the present disclosure.
Figure 1B:
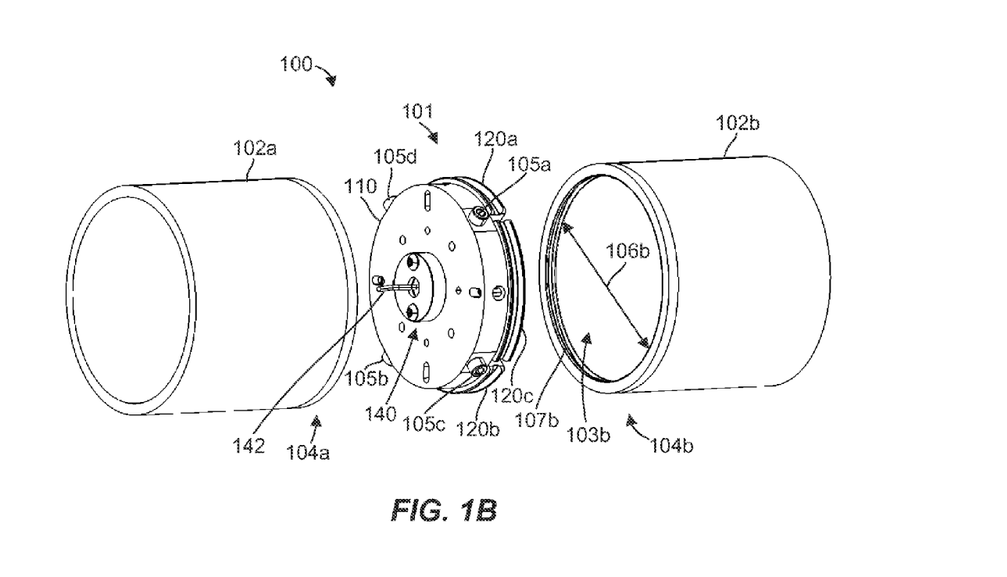

One example of an internal clamp system 100 is illustrated in the exploded views of FIGS. 1A and 1B. The clamp system 100 can comprise a clamp 101 for internally coupling and decoupling two components 102a, 102b. In one embodiment, the two components 102a, 102b can be two components of a sabot or a missile. For example, the component 102a can be configured to contain guidance electronics, a battery, a parachute within an interior 103a, and/or support an aerodynamic surface, such as a fin, on an exterior of the component 102a. The clamp 101 can be coupled or attached to an end 104a of the component 102a, for example, with one or more fasteners 105a-d. The component 102b can be configured to contain a payload, such as a UAV, within an interior 103b of the component 102b. The component 102b can be separated from the component 102a in order to deploy the payload from an open end 104b of the component 102b. To facilitate payload deployment, the interior 103b of the component 102b can be free of protrusions that would impede or interfere with deployment of the payload from the open end 104b of the component 102b. As described hereinafter, the clamp 101 and interior clamp mating features of the two components 102a, 102b can facilitate such a protrusion-free interior. In addition, because the clamp 101 engages interior features of the two components 102a, 102b, exteriors of the two components 102a, 102b can remain free of clamping apparatuses or other features, which can be beneficial for a sabot or other applications where external clamp features or structures are not desired.

In one aspect, the clamp 101 can facilitate coupling ends of the two components 102a, 102b together to form a butt-type joint while also coaxially aligning the two components 102a, 102b. The clamp 101 can therefore be used when exteriors of the two components 102a, 102b are not accessible for clamping and/or there is not enough space to use a typical clamp (such as an external V-band clamp, sometimes called a Marman clamp). The clamp 101 can couple the two components 102a, 102b together with no internal structure of the two components 102a, 102b protruding or extending inward of their nominal inner diameters 106a, 106b, respectively. As a result of this, a rigid object close to the size of the inner diameter 106b of the component 102b can be loaded/unloaded from the component 102b without interference. In another aspect, the clamp 101 can effectively couple the two components 102a, 102b having relatively small inner diameters 106a, 106b, such as less than about 8 inches. Although the clamp 101 can be configured for a small internal diameter, it should be recognized that the clamp 101 can be configured for any suitable internal diameter, large or small, and is not to be limited to any particular internal diameter size disclosed herein.

With further reference to FIGS. 1A and 1B, the clamp 101 can include a base 110 configured to fit within an interior region of at least one of two components to be coupled to one another, such as the interior 103a of component 102a. In one aspect, the base 110 can be attachable to component 102a, such as via the fasteners 105a-d. The clamp 101 can also include an engagement member, such as a plurality of engagement members 120a-d, movably supported about the base 110. The engagement members 120a-d can be configured to interface with and engage interior portions 107a, 107b of the two components 102a, 102b, respectively, when in a coupled position and to be separated from the interior portions 107a, 107b of the two components 102a, 102b when in a decoupled position, as discussed further hereinafter.

In one aspect, the engagement members 120a-d can be configured to interface with and engage interior portions 107a, 107b of the two components 102a, 102b having circle-shaped cylindrical configurations. It should be recognized that a clamp and two components to be coupled to one another can be of any suitable cross-sectional shape or configuration, such as a triangle, rectangle, or any other polygon shape. In another aspect, the engagement members 120a-d can be operable to engage the two components 102a, 102b in a plurality of locations about the interior portions 107a, 107b. It should be recognized however that any suitable number of engagement members can be employed. For example, a clamp can have only a single engagement member to couple two components along interfacing edges, such as interfacing straight edges of rectangle-shaped tubular components. In yet another aspect, the plurality of engagement members 120a-d of the clamp 101 can be configured to move radially to engage substantially a full circumference of the interior portions 107a, 107b of the two components 102a, 102b. This can facilitate a greater expansion distance and contraction clearance when clamping about substantially a full circumference of two components than can be achieved by a typical single clamp V-band piece, which can yield when forced to move excessive distances to expand for coupling and/or contract for decoupling.

The clamp 101 can further include a wedge 130 movably supported about the base 110. The wedge 130 can be operable to facilitate movement of the engagement member 120a-d between the coupled and the decoupled positions. In addition, the clamp 101 can include a secure and release mechanism 140 operable with the base 110 and the wedge 130. For example, the secure and release mechanism 140 can alternately secure the wedge 130 to maintain the engagement members 120a-d in the coupled position and release the wedge 130 to facilitate movement of the engagement members 120a-d to the decoupled position. In one aspect, the secure and release mechanism 140 can be remotely actuated, such as via a cable 142, to release the wedge 130.

Figure 2:
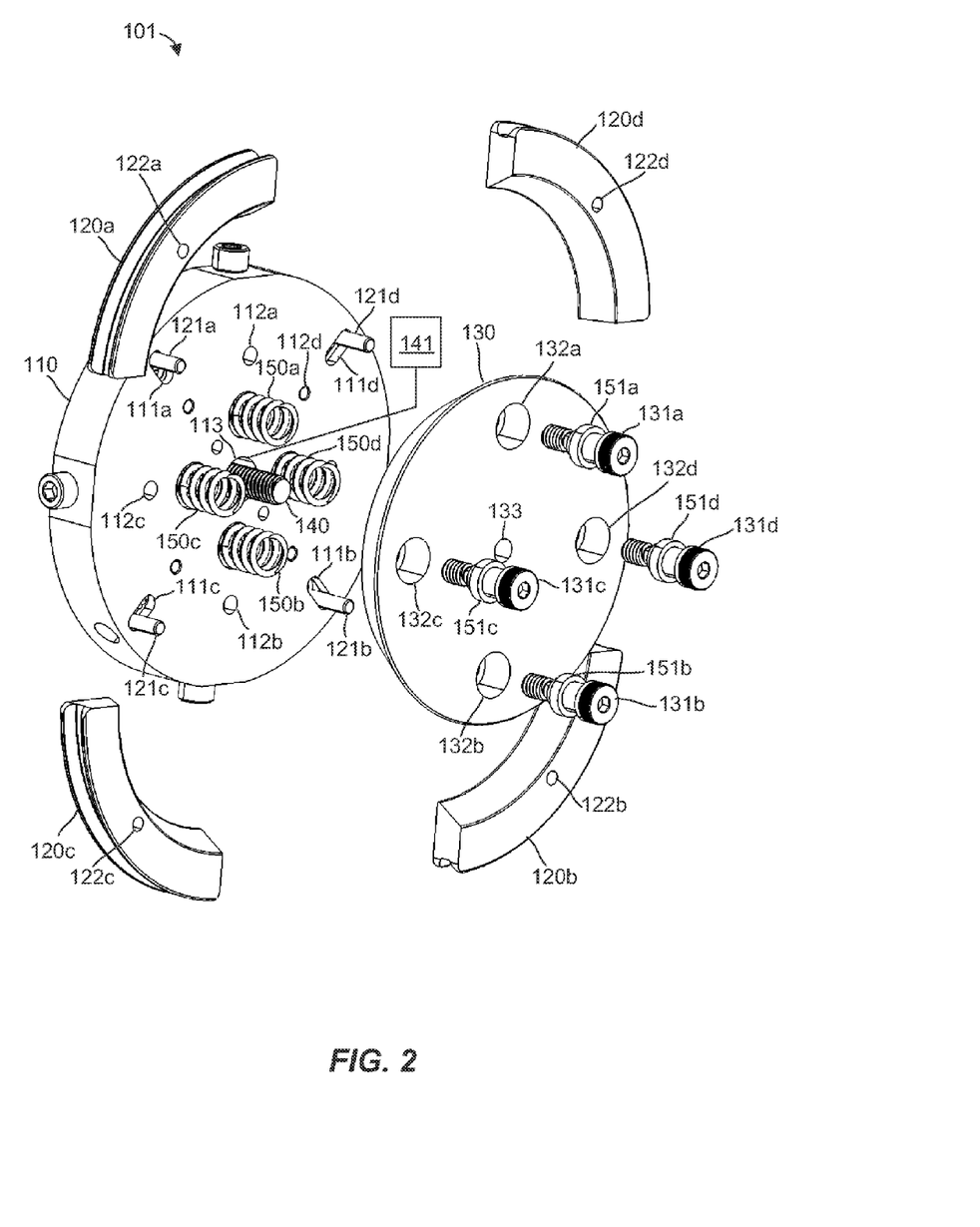
FIG. 2 is an exploded view of a clamp of the internal clamp system of FIGS. 1A and 1B.

With reference to FIG. 2, the clamp 101 of FIGS. 1A and 1B is shown isolated from the components 102a, 102b in an exploded view to illustrate various clamp components. For example, the base 110 can have one or more openings 111a-d and extension portions 121a-d can extend into the openings 111a-d, respectively. In addition, the engagement members 120a-d can be coupled to the extension portions 121a-d, such as via holes 122a d 121a d, respectively. Thus, the engagement member 120a-d can be movably supported about the base 110 by the extension portions 121a-d extending from the engagement members 120a-d into the openings 111a-d. As shown, an engagement member and an extension portion can be separate components coupled together. It should be recognized, however, that an engagement member and an extension portion can be a single unitary structure.

The wedge 130 can be movably supported about the base 110, at least in part, by one or more fasteners 131a-d. In this case, the fasteners 131a-d extend through holes 132a-d in the wedge 130 and couple with holes 112a-d in the base 110, respectively. The fasteners 131a-d can be configured to maintain the base 110 and wedge 130 coupled to one another when the engagement members 120a-d are in the decoupled position. In one aspect, a fastener can comprise a shoulder bolt. Although fasteners are shown, it should be recognized that the wedge 130 can be movably supported about and/or coupled to the base by any suitable structure, feature, or mechanism.

In one aspect, the secure and release mechanism 140 can comprise a fastener. The fastener can extend through a hole 113 in the base 110 and couple with the wedge 130 via a hole 133. Thus, the secure and release mechanism fastener 140 can be operable to adjust a position of the base 110 and the wedge 130 relative to one another. For example, the secure and release mechanism fastener 140 can be rotated to move the wedge 130 toward or away from the base 110. Such adjustment can facilitate movement of the engagement members 120a-d between the decoupled and coupled positions, as discussed further hereinafter. In one aspect, the secure and release mechanism 140 can include a pyrotechnic charge 141 to sever or fracture the fastener, which can facilitate movement of the engagement members 120a-d to the decoupled position. In one embodiment, the secure and release mechanism 140 can comprise a ball lock detent pin. Thus, it should be recognized that any suitable secure and release mechanism can be utilized in accordance with the present disclosure.

In one aspect, the wedge 130 can be biased to facilitate movement of the engagement members 120a-d toward the decoupled position, such as by one or more springs 150a-d disposed between the base 110 and the wedge 130. The springs 150a-d can be configured to provide an equal force distribution between the base 110 and the wedge 130. In addition, the clamp 101 can include one or more dampeners 151a-d to dampen motion of the wedge 130 upon release of the wedge 130 by the secure and release mechanism 140. In one aspect, the dampeners 151a-d can comprise elastomeric or spring elements disposed about or associated with the fasteners 131a-d and configured to fit within the holes 132a-d, respectively. Thus, as the wedge 130 is forced away from the base 110, such as by the springs 150a-d, the dampeners 151a-d can lessen the impact of the wedge 130 against the fasteners 131a-d.

Figure 3A:
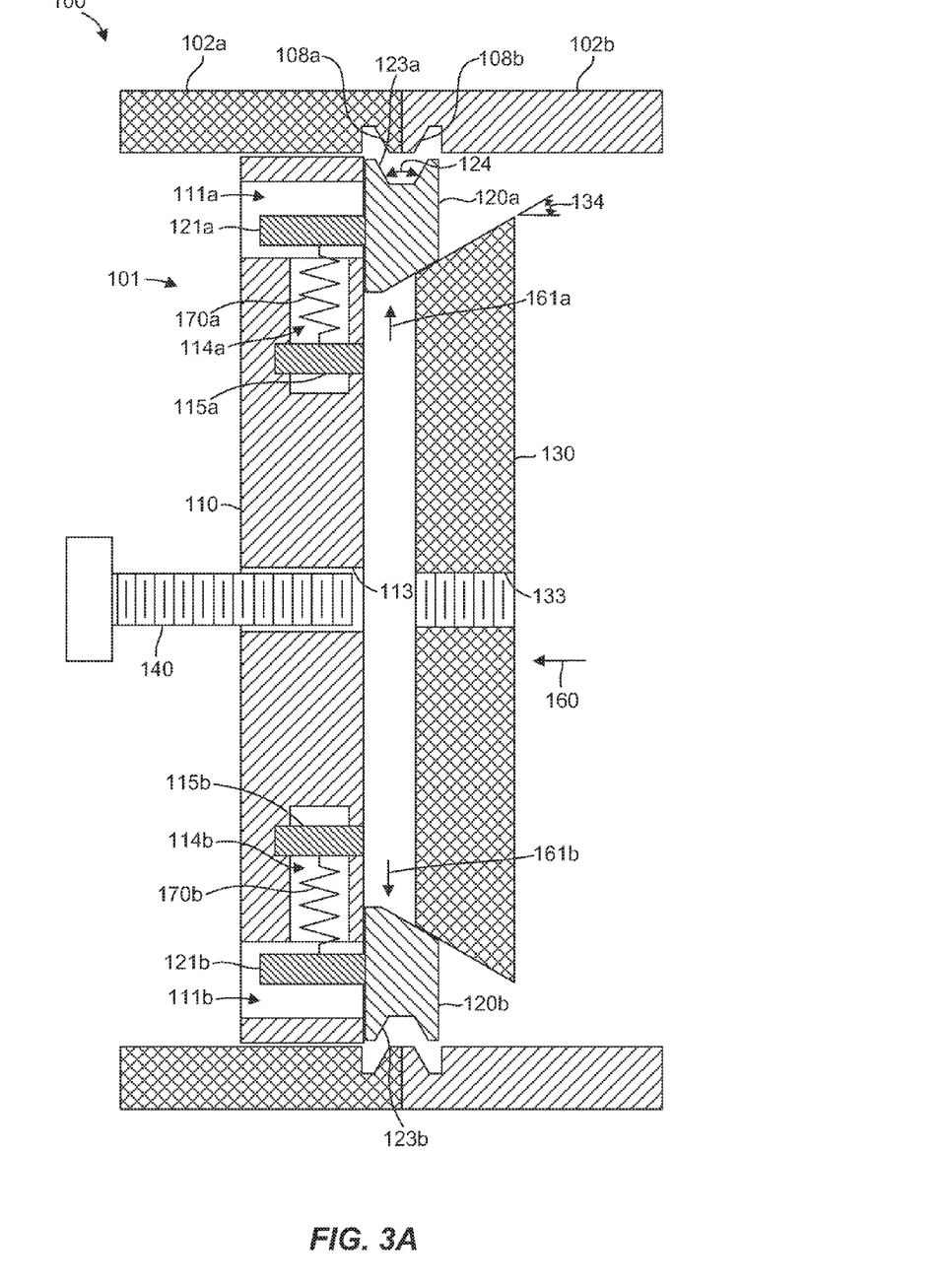
FIG. 3A is a cross-sectional schematic illustration showing aspects of the internal clamp system of FIGS. 1A and 1B with an engagement member of the clamp in a decoupled position, in accordance with an embodiment of the present disclosure.
Figure 3B:
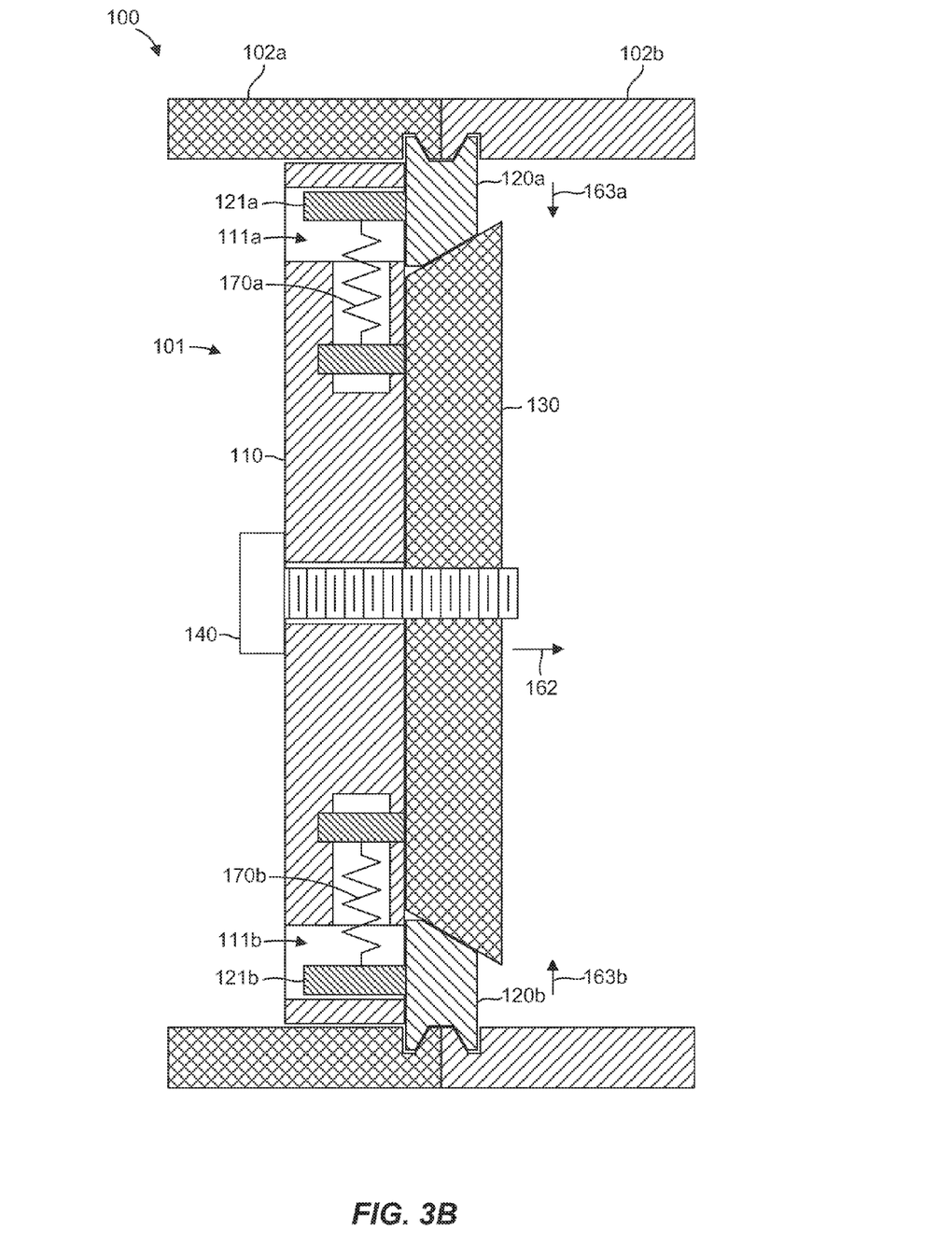
FIG. 3B is a cross-sectional schematic similar to FIG. 3A with the engagement member of the clamp in a coupled position.

Shown in FIGS. 3A and 3B are schematic illustrations showing certain aspects of the internal clamp 101 and the two components 102a, 102b of the internal clamp system 100. For example, the engagement members 120a, 120b can have a component interfacing portion 123a, 123b to interface with complementary mating recesses 108a, 108b in the two components 102a, 102b, respectively. In one aspect, the component interfacing portion 123a, 123b can comprise a V-channel configuration. The V-channel can have any suitable included angle 124, such as between about 10 degrees and about 120 degrees (nominally 60 degrees), to facilitate coupling the two components 102a, 102b, such as by forming a butt-type joint. The wedge 130 and the engagement members 120a, 120b can have an interface angle 134 configured to facilitate movement of the engagement member 120a, 120b between the decoupled position (FIG. 3A) and the coupled position (FIG. 3B). The interface angle 134 can be any suitable angle, such as about 50 degrees.

For example, as shown in FIG. 3A, as the wedge 130 is caused to move toward the base 110 in direction 160, such as by the secure and release mechanism 140 or fastener engaging the threaded hole 133, the wedge 130 can slide against the engagement members 120a, 120b and force the engagement members 120a, 120b to expand outward toward the two components 102a, 102b in directions 161a, 161b, respectively, toward the coupled position. Thus, as the engagement members 120a, 120b expand outward, the two components 102a, 102b can be drawn together to form a butt-type joint, which may be configured to be sealed upon coupling of the two components 102a, 102b. Because of the V-channel geometry of the component interfacing portion 123a, 123b and the mating recesses 108a, 108b, the clamp 101 can cause self-centering or alignment of the two components 102a, 102b relative to one another upon coupling. In addition, no internal stresses are generated in the engagement members 120a, 120b by the action of expanding (until encountering the two components 102a, 102b), thus allowing a greater range of diameter change of the clamp 101 over a typical single V-band clamp.

As shown in FIG. 3B, the secure and release mechanism 140 can maintain the engagement members 120a, 120b in the coupled position. When decoupling of the two components 102a, 102b is desired, the secure and release mechanism 140 can be caused to facilitate movement of the wedge 130 away from the base 110 in direction 162, which can in turn facilitate movement of the engagement members 120a, 120b to withdraw or contract inward away from the two components 102a, 102b in directions 163a, 163b, respectively, such as by sliding along the wedge 130 as the wedge 130 moves away from the base 110, toward the decoupled position. In one aspect, the secure and release mechanism fastener 140 can simply be unthreaded from the hole 133 in the wedge 130 to facilitate movement of the wedge away from the base 110. In another aspect, the secure and release mechanism 140 can include a pyrotechnic or explosive charge configured to sever or fracture the fastener, for example, upon receiving a remote detonation signal, to facilitate movement of the wedge away from the base 110. Thus, a secure and release mechanism 140 having only a single bolt or fastener can be used to activate the clamp 101. Once the engagement members 120a, 120b are retracted inward the two components 102a, 102b can be free to separate from one another.

In one aspect, the engagement members 120a, 120b can be biased toward the decoupled position. For example, one or more springs 170a, 170b can be associated with the base 110 to bias the engagement members 120a, 120b, respectively, toward the decoupled position. As shown, the springs 170a, 170b can be disposed in openings 114a, 114b and coupled to extension portions 121a, 121b, respectively, to apply the biasing spring force to the engagement members 120a, 120b. The springs 170a, 170b can be anchored to the base 110 by any suitable means, such as by attaching to pins 115a, 115b, respectively. Thus, the engagement members 120a, 120b can be biased toward the decoupled position via the springs 170a, 170b associated with the base 110, such that the engagement members 120a, 120b are caused to move toward the decoupled position automatically upon release of the wedge 130 by the secure and release mechanism 140, which can cause or force the wedge 130 to move in direction 162. Thus, the springs 170a, 170b can provide decoupling action stability by positively pulling away from the inside of the two components 102a, 102b during an activation event to initiate decoupling, such as fracturing the fastener of the secure and release mechanism 140.

Figure 4A:
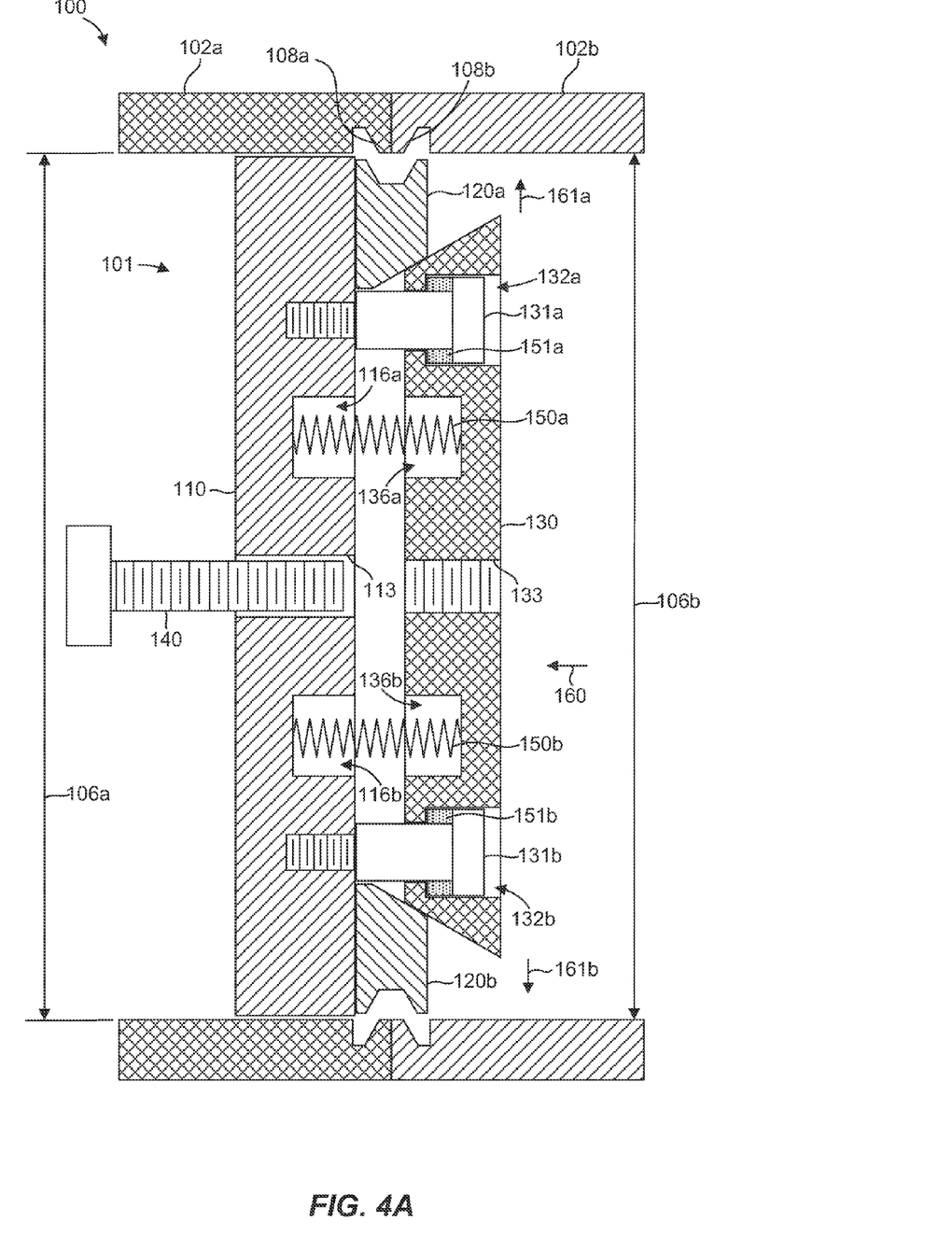
FIG. 4A is a cross-sectional schematic illustration showing other aspects of the internal clamp system of FIGS. 1A and 1B with an engagement member of the clamp in a decoupled position, in accordance with an embodiment of the present disclosure.
Figure 4B:
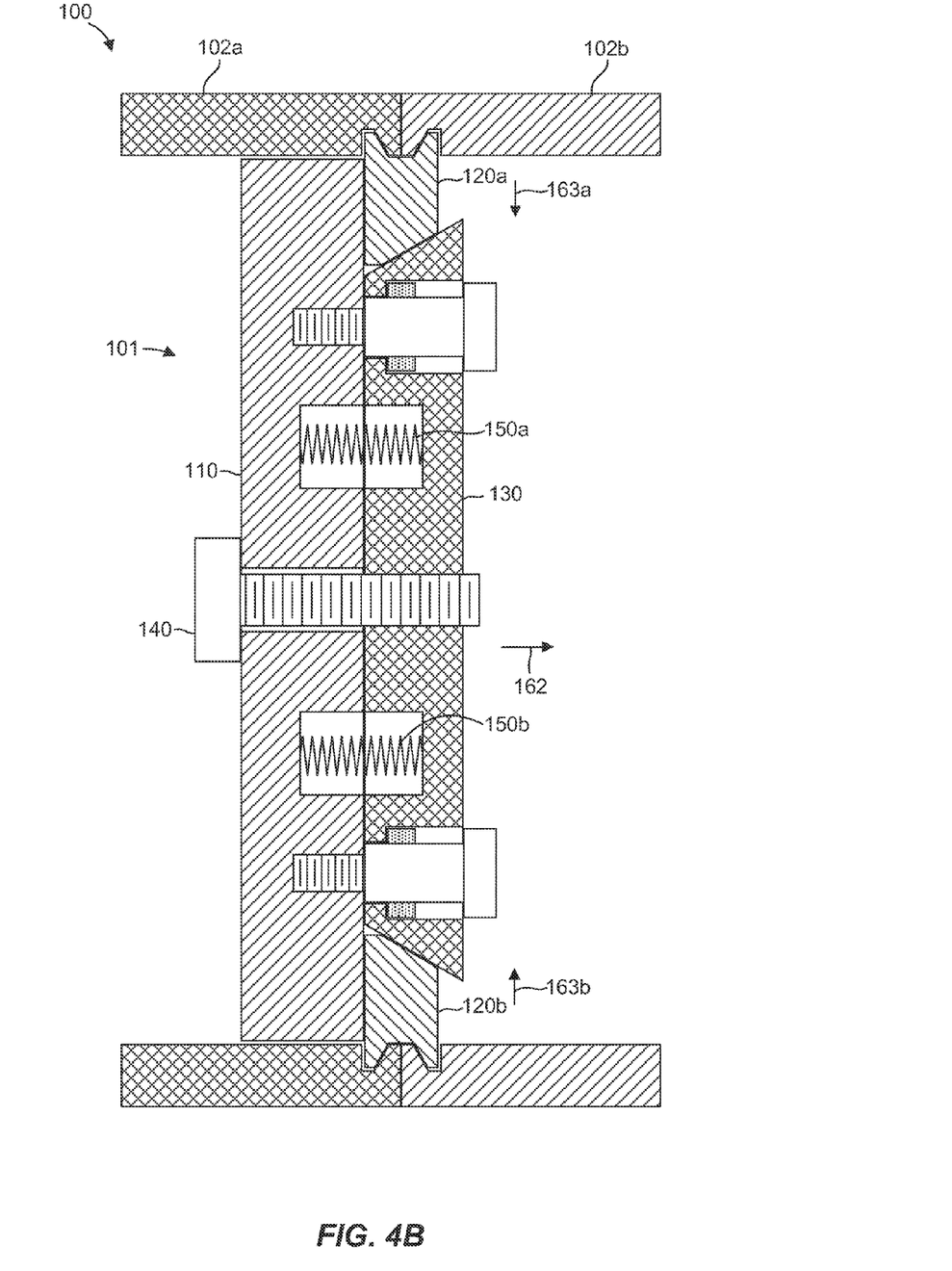
FIG. 4B is a cross-sectional schematic similar to FIG. 4A with the engagement member of the clamp in a coupled position.

Shown in FIGS. 4A and 4B are additional schematic illustrations showing certain aspects of the internal clamp 101 and the two components 102a, 102b of the internal clamp system 100. For example, the springs 150a, 150b can be captured by recesses 116a, 116b in the base 110 and recesses 136a, 136b in the wedge 130, respectively, to provide a biasing force against the wedge 130 tending to push the wedge 130 away from the base 110. The springs 150a, 150b can therefore assist the springs 170a, 170b, discussed hereinabove with respect to FIGS. 2-3B, and facilitate movement of the engagement members 120a, 120b from the coupled position (FIG. 4B) to the decoupled position (FIG. 4A).

In addition, the shoulder bolt fasteners 131a, 131b can be configured to interface with the holes 132a, 132b of the wedge 130 to guide movement of the wedge 130 with respect to the base 110. In one aspect, the springs 150a, 150b can provide a distributed or uniform force about the wedge 130 to facilitate even and non-binding movement of the holes 132a, 132b of the wedge 130 about the shoulder bolt fasteners 131a, 131b. The shoulder bolt fasteners 131a, 131b can therefore guide movement of the wedge 130 as the secure and release mechanism 140 engages the hole 133 in the wedge 130 and causes the wedge 130 to move toward the base 110 in direction 160, as discussed hereinabove. Thus, the shoulder bolt fasteners 131a, 131b can facilitate uniform displacement of the engagement members 120a, 120b outward in directions 161a, 161b to couple the two components 102a, 102b in the coupled position.

Furthermore, the springs 150a, 150b can be compressed by the movement of the wedge 130 toward the base 110. This can provide the preload and biasing force available from the springs 150a, 150b to aid in moving the wedge 130 away from the base 110 in direction 162, which can facilitate movement of the engagement members 120a, 120b inwardly in directions 163a, 163b toward the decoupled position. The dampeners 151a, 151b can dampen or cushion an impact of the wedge 130 against the shoulder bolt fasteners 131a, 131b, respectively, when the wedge 130 is released by the secure and release mechanism 140.

The recesses 108a, 108b formed in the components 102a, 102b, respectively, for mating with the clamp 101 can be beneficial in that no part of the components 102a, 102b need extend inward beyond the nominal inner diameter 106a, 106b to facilitate clamping. In one aspect, the inner diameter 106a and/or 106b can be constant (aside from the recesses 108a, 108b) so that a payload that is nearly the same size as the inner diameters 106a, 106b can exit the components 102a, 102b unobstructed, such as upon separation of the components 102a, 102b. In other words, no protrusions exist on the interiors of the components 102a, 102b that prevent a payload from deployment. The internally located recesses 108a, 108b can also be beneficial in that there are no externally located protrusions needed for coupling the components 102a, 102b to one another that can occupy external space that may cause interference or other concerns.

In one aspect, the clamp 101 can be configured to provide a relatively stiff joint when coupling the components 102a, 102b to one another. It should be recognized, however, that flexible materials can be utilized, such as in the engagement members 120a, 120b and/or the wedge 130 to provide some flexibility to the coupling or joint. In one embodiment, the secure and release mechanism 140 can comprise a spring-loaded bolt to facilitate movement of the wedge 130 and the engagement members 120a, 120b, which can provide some flexibility in the coupling or joint.

In accordance with one embodiment of the present invention, a method for facilitating internal coupling and decoupling of two components is disclosed. The method can comprise providing a clamp to couple and decouple two components, the clamp having a base configured to fit within an interior of at least one of the two components, an engagement member movably supported about the base between a coupled position and a decoupled position, a wedge movably supported about the base and operable to facilitate movement of the engagement member between the coupled and the decoupled positions, and a secure and release mechanism operable with the base and the wedge to alternately secure the wedge to maintain the engagement member in the coupled position and release the wedge to facilitate movement of the engagement member to the decoupled position. Additionally, the method can comprise facilitating interfacing with and engagement of interior portions of the two components by the engagement member when in the coupled position and separation of the engagement member from the interior portions of the two components when in the decoupled position. In one aspect of the method, the base can be attachable to one of the two components. It is noted that no specific order is required in this method, though generally in one embodiment, these method steps can be carried out sequentially.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A clamp for internally coupling and decoupling two components, comprising:
    a base configured to fit within an interior of at least one of two components to be coupled to one another;
    an engagement member movably supported about the base, and configured to interface with and engage interior portions of the two components when in a coupled position and to be separated from the interior portions of the two components when in a decoupled position;
    a wedge movably supported about the base and operable to facilitate movement of the engagement member between the coupled and the decoupled positions;
    a secure and release mechanism operable with the base and the wedge to alternately secure the wedge to maintain the engagement member in the coupled position and release the wedge to facilitate movement of the engagement member to the decoupled position; and
    a dampener associated with the wedge to dampen motion of the wedge after being released by the secure and release mechanism, wherein the wedge moves undampened for a distance and the dampener dampens motion of the wedge only after the wedge has moved the distance to facilitate movement of the engagement member to the decoupled position.

2. The clamp of claim 1, wherein the secure and release mechanism comprises a fastener.

3. The clamp of claim 2, wherein the secure and release mechanism further comprises a pyrotechnic charge to sever the fastener.

4. The clamp of claim 1, wherein the engagement member comprises a V-channel configuration to interface with the two components.

5. The clamp of claim 1, wherein the engagement member is biased toward the decoupled position.

6. The clamp of claim 5, wherein the engagement member is biased via a spring associated with the base.

7. The clamp of claim 1, wherein the wedge is biased to facilitate movement of the engagement member toward the decoupled position.

8. The clamp of claim 7, wherein the wedge is biased via a spring disposed between the base and the wedge.

9. The clamp of claim 1, wherein the base is attachable to one of the two components.

10. The clamp of claim 1, wherein the engagement member is movably supported about the base by an opening in the base and an extension portion extending from the engagement member into the opening.

11. The clamp of claim 1, wherein the wedge is movably supported about the base, at least in part, by a fastener.

12. The clamp of claim 11, wherein the fastener is configured to maintain the base and wedge coupled to one another when the engagement member is in the decoupled position.

13. The clamp of claim 12, wherein the fastener comprises a shoulder bolt.

14. The clamp of claim 1, further comprising a retention mechanism coupled to the base and configured to movably support the wedge about the base, wherein the dampener is configured to reduce an impact of the wedge against the retention mechanism.

15. The clamp of claim 1, wherein the engagement member is configured to interface with and engage interior portions of the two components having cylindrical configurations.

16. The clamp of claim 1, wherein the engagement member comprises a plurality of engagement members operable to engage the two components in a plurality of locations.

17. An internal clamp system, comprising:
    two components to be coupled to one another; and
    an internal clamp to couple and decouple the two components, the clamp having
        a base configured to fit within an interior of at least one of the two components,
        an engagement member movably supported about the base, and configured to interface with and engage interior portions of the two components when in a coupled position and to be separated from the interior portions of the two components when in a decoupled position,
        a wedge movably supported about the base and operable to facilitate movement of the engagement member between the coupled and the decoupled positions,
        a secure and release mechanism operable with the base and the wedge to alternately secure the wedge to maintain the engagement member in the coupled position and release the wedge to facilitate movement of the engagement member to the decoupled position; and
        a dampener associated with the wedge to dampen motion of the wedge after being released by the secure and release mechanism, wherein the wedge moves undampened for a distance and the dampener dampens motion of the wedge only after the wedge has moved the distance to facilitate movement of the engagement member to the decoupled position.

18. The system of claim 17, wherein the two components comprise first and second sabot components, and wherein the internal clamp operates to couple and decouple the first and second sabot components.

19. A method for facilitating internal coupling and decoupling of two components, comprising:
    providing a clamp to couple and decouple two components, the clamp having
        a base configured to fit within an interior of at least one of the two components,
        an engagement member movably supported about the base between a coupled position and a decoupled position,
        a wedge movably supported about the base and operable to facilitate movement of the engagement member between the coupled and the decoupled positions,
        a secure and release mechanism operable with the base and the wedge to alternately secure the wedge to maintain the engagement member in the coupled position and release the wedge to facilitate movement of the engagement member to the decoupled position, and a dampener associated with the wedge to dampen motion of the wedge after being released by the secure and release mechanism, wherein the wedge moves undampened for a distance and the dampener dampens motion of the wedge only after the wedge has moved the distance to facilitate movement of the engagement member to the decoupled position; and facilitating interfacing with and engagement of interior portions of the two components by the engagement member when in the coupled position and separation of the engagement member from the interior portions of the two components when in the decoupled position.

20. The method of claim 19, wherein facilitating interfacing with and engagement of interior portions of the two components further comprises attaching the base to one of the two components.

\* \* \* \* \*